Feb. 26, 1952

H. W. WASHBURN

MASS SPECTROMETRY

Re. 23,464

2 SHEETS—SHEET 1

Original Filed April 28, 1945

INVENTOR.
HAROLD W. WASHBURN
BY
Chmotie and Angus
ATTORNEYS

Feb. 26, 1952 H. W. WASHBURN Re. 23,464

MASS SPECTROMETRY

Original Filed April 28, 1945 2 SHEETS—SHEET 2

INVENTOR.
HAROLD W. WASHBURN
BY
Christie and Angus
ATTORNEYS

Reissued Feb. 26, 1952

Re. 23,464

UNITED STATES PATENT OFFICE 23,464

MASS SPECTROMETRY

Harold W. Washburn, Pasadena, Calif., assignor to Consolidated Engineering Corporation, Pasadena, Calif., a corporation of California Original No. 2,475,653, dated July 12, 1949, Serial No. 590,917, April 28, 1945. Application for reissue October 26, 1951, Serial No. 253,325

14 Claims. (Cl. 250—41.9)

Figure 2:
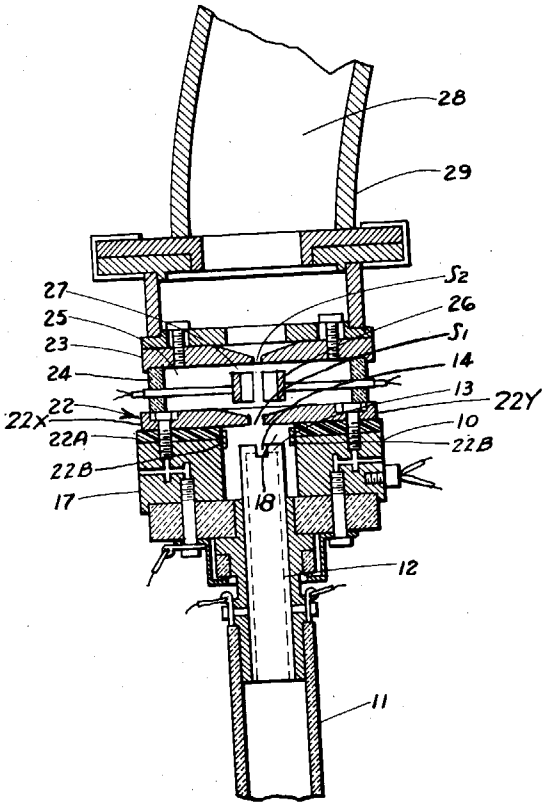

Matter enclosed in heavy brackets [ ] appears in the original patent but forms no part of this reissue specification; matter printed in italics indicates the additions made by reissue.

This invention is concerned with mass spectrometry. It provides improvements in methods of and apparatus for forming an ion beam from gaseous molecules and propelling the beam into an analyzer chamber, to the end that the stability of spectra and the accuracy and rapidity of analysis is improved.

A mass spectrometer is essentially an apparatus for producing ions and sorting them according to the ratio of their mass to their charge, i. e. according to their specific mass. A sample to be analyzed, for example a gas mixture, is ionized (for example, by electron bombardment) and the resulting ions are propelled by an electrical potential into an analyzer. The ions enter the analyzer as an unsorted beam, and in the analyzer are sorted under the influence of an electro-magnetic field in accordance with their specific mass into a series of divergent homogeneous ion beams. The sorted ions are collected and discharged, the quantity of each kind of ions being measured by the amount of current that they discharge upon collection.

In one type of mass spectrometer, ionization is accomplished by bombarding molecules of the sample in an ionization chamber with an electron beam. The resulting ions are forced through a plurality of collimating electrodes having oriented slits or apertures therein, and emerge into an analyzer tube as an unsorted beam. It has been proposed heretofore to form the ions within the chamber and to propel them into the collimating aperture in the first collimating electrode by means of a potential maintained across the zone of ion formation by means of a pusher electrode. The beam thus formed emerges from the slit of the first collimating electrode and is propelled to the slit in the second collimating electrode by a potential maintained between the two and it has been proposed heretofore to aid collimation by one or more auxiliary or focussing electrodes maintained at a potential intermediate those of the collimating electrodes and disposed between the collimating electrodes but to one or both sides of the ion beam. In this fashion a transverse component of propelling potential may be produced and employed to vary the width of beam and to aid in collimation by preventing ion paths in the beam from crossing over each other between the collimating electrodes.

As the result of my investigations, I have discovered that improved results are obtained with a mass spectrometer if the pusher electrode is, in effect, eliminated so that there is no substantial potential behind the zone of electron bombardment in which the ions are formed, but instead the potential is applied to the ions immediately after they diffuse from the region of their formation. Thus my invention contemplates in a mass spectrometer, the combination which comprises an ionization chamber, an inlet electrode disposed within the chamber and having an inner end provided with a passage for admission of molecules into the chamber with a slot transverse to the passage, a second electrode spaced from the inlet electrode, means for producing an electrical propelling potential between the electrodes in the ionization chamber, and means for propelling an electron beam through the slot transverse to the passage. In such an arrangement of apparatus the ions are formed by electron bombardment in a region outside the field of major ion propelling potential and enter this field primarily as a result of diffusion. Moreover, since ionization occurs in the restricted space of the slot rather than in the larger space within the ionization chamber, the electron bombardment and consequent ionization takes place at a point where the sample is relatively highly concentrated and a higher percentage of the entering molecules are given an opportunity to ionize. This increases the amount of ions produced from a given sample and increases the effective size of the sample, thus increasing the accuracy and speed of analysis.

In the preferred form of my apparatus the slot in the inlet electrode is in line with the slit in the adjacent propelling electrode and preferably lies in a plane defined by the slits in the collimating electrodes, i. e. the plurality of propelling electrodes employed to form the ion beam and project it into the analyzer tube. It has been found that this type of structure aids markedly in obtaining improved results.

Further improvements in results can be obtained if the current of the electron beam passing through the slot is maintained substantially constant, for example, as indicated at an electron catcher at which the electrons are discharged after passing through the slot. In the structure of the invention practically all of the ion beam formed in the ionization chamber passes through the slits into the analyzer, so that the amount of ions entering the analyzer is proportional to the total electron current as collected by the catcher.

It has been found that some types of ions formed in a mass spectrometer tend to lodge upon dielectric surfaces within the apparatus and to build up static charges on these surfaces. The gradual accumulation of such charges from this and other sources affects the calibration of the apparatus by changing the focussing of ions in the beam. The effect is particularly marked at the insulator which is employed as a spacer between collimating or propelling electrodes, and I have discovered that focussing electrodes disposed between the collimating electrodes may serve a double function if they are constructed in the form of a shield which obstructs a major portion of the view between the ion beam and the insulator. In this manner the effect of the static charge of the insulator upon the ion beam is minimized. Accordingly my invention also contemplates the shielding of the ion beam from the effect of static charges built up on insulating surfaces by the interposition of a conductive shield therebetween which is electrically connected to a part of the apparatus maintained under potential and particularly the combination which comprises collimating electrodes, each having apertures through which an ion beam is propelled, an insulating spacer holding the electrodes apart, a plurality of focussing electrodes disposed respectively on opposite sides of the electron beam between the collimating electrodes and between the insulator and the beam, these focussing electrodes being spaced from each other and from the collimating electrodes and the insulator but of such size that they obstruct a major portion of the view between the insulator and the beam.

The foregoing type of structure is of particular benefit when employed in conjunction with the slotted inlet electrode described previously. Preferably, the focusing electrodes are plates bent at the two ends into channel shape and held in place (out of contact with each other and between the collimating electrodes) by leads projecting through the insulator. Thus the focussing electrodes substantially enclose the ion beam or ribbon passing through the slits.

Figure 1:
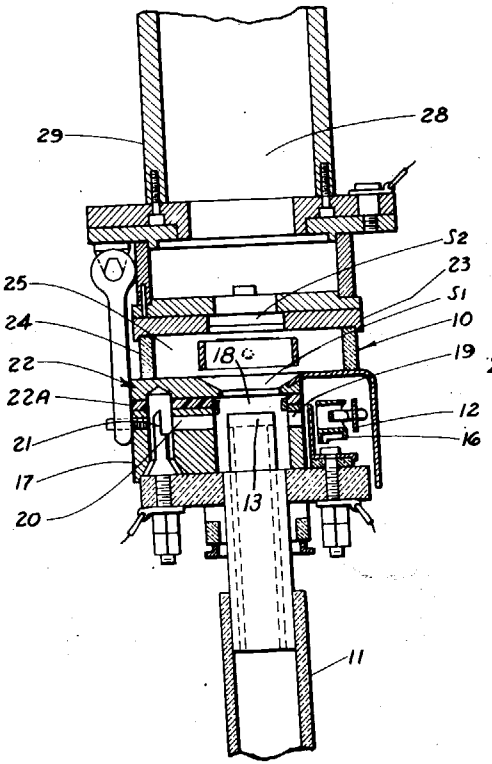
Figure 3:
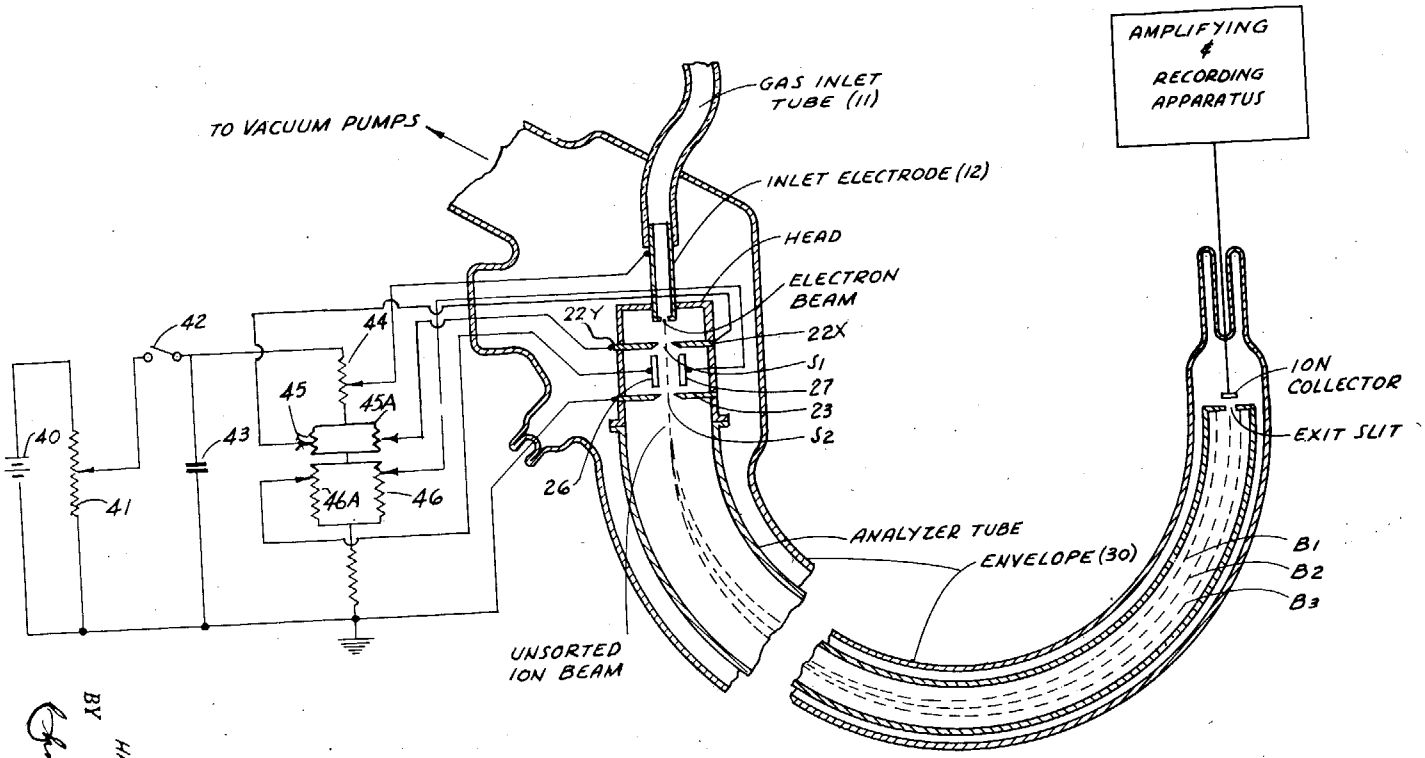

The invention will be understood more thoroughly in the light of the following detailed description, taken in conjunction with the accompanying drawings in which:

Figs. 1 and 2 are longitudinal sections taken at right angles to each other through the head of a mass spectrometer adapted to the practice of my invention; and Fig. 3 is a schematic diagram of a mass spectrometer equipped with the head of Figs. 1 and 2.

Referring to the drawings, it will be seen that the apparatus comprises a cylindrical head 10 the rear of which connects with a gas inlet tube 11 of insulating material. Within the head there is an inlet electrode 12 in the form of a metallic tube which communicates with the gas inlet conduit at its rear and which is partially closed at its front end by a cylindrical electrode plate 13 having a transverse slot to accommodate an electron beam 14.

The electron beam is produced by an electron gun 16 mounted outside a block 17 which encloses an ionization chamber 18 within which the slotted electrode plate is disposed. (See Figs. 1 and 2.)

The electron beam enters the ionization chamber through an aperture 19 which is in line with the slot in the inlet electrode, passes through the slot, and thence through an aperture 20 in the opposite side of the block to an electron catcher 21.

The front of the ionization chamber is formed by a propelling electrode 22 (composed of segments 22X, 22Y) provided with a slit $S_1$ that is substantially in line with the slot in the inlet electrode but slightly offset therefrom, since (due to the magnetic field) the ion paths are cycloidal. A second propelling electrode 23 provided with a slit $S_2$ is disposed in front of the first propelling electrode with the slit $S_2$ in line with the slot in the inlet electrode and the slit $S_1$. The two propelling electrodes are spaced from each other by a ring 24 of quartz or similar insulating material within which is a focussing chamber 25 containing an opposed pair of semicircular focussing electrodes 26, 27 which extend close to, but are separated from, the two propelling electrodes by adequate dielectric gaps. The focussing electrodes are thus constructed to permit them to serve the dual function of focussing the ion beam passing through the slits $S_1$, $S_2$ and of shielding the beam from the effects of vagrant ions which tend to collect upon the insulating spacer ring.

Electrode segments 22X, 22Y are spaced from each other by an insulator ring 22A through which, at a point spaced from its inner periphery, the segments are conductively joined to the block 17 which forms the wall of the ionization chamber 18.

The ion beam is shielded from the effect of static charges built up on the insulator ring by a shield ring 22B disposed inside the insulator ring, electrically connected to the block, and separated from the electrode segments 22X, 22Y by a substantial gap.

The focussing chamber communicates with an analyzing chamber 28 of the mass spectrometer through the slit $S_2$ in the second propelling electrode, which latter is fastened to an analyzer tube 29 that forms the wall of the analyzing chamber.

Referring now to Fig. 3, it will be observed that the head 10 of the mass spectrometer and the attached analyzer tube 29 are enclosed within an envelope 30, through the wall of which the gas inlet tube 11 projects. A high degree of vacuum is maintained within the envelope by means of vacuum pumps (not shown) connected to the envelope.

The molecules of a gas sample being admitted into the ionization chamber through the inlet electrode are bombarded by the electron beam passing through the slot at its end and thus converted into ions. These ions are propelled as an unsorted beam into the analyzer tube by electrical potentials established between the several electrodes in the head by an electrical system shown schematically at the left of Fig. 3. Thus, a battery or other direct current supply 40 is connected to the ends of a potentiometer 41. The positive end of this potentiometer and its slider are connected through a switch 42 to a condenser 43. A potential dividing network is connected across this condenser and takes the form of a resistor or potentiometer 44 in series with a parallel pair of resistors or potentiometers 45, 45A and a second pair 46, 46A which are in turn connected to ground at the negative end of the network.

The inlet electrode is connected to the positive side of the network at the slider of the potentiometer 44. The two segments 22X, 22Y of the first propelling electrode are connected respectively to the sliders of the potentiometers 45, 45A. One of the focussing electrodes is connected to the slider of the potentiometer 46; the other focussing electrode is connected to the slider of the potentiometer 46A, and the second propelling electrode is connected to the negative end of the network and to ground. The leads through which the foregoing connections are made pass through seals in the wall of the envelope.

In the operation of the apparatus, a high degree of vacuum is established within the envelope and a sample of gas to be analyzed is admitted through the gas inlet tube and passes through the slot in the inlet electrode, where it is bombarded by the electron beam. For optimum results the current producing this electron beam should be maintained constant, which result can be obtained by observing the current at the electron catcher by a conventional meter (not shown) and adjusting the electron current (for example, by the means shown in co-pending application Serial No. 591,010, filed April 30, 1945, by Harold W. Washburn et al., *now Patent No. 2,486,452.*)

Molecules of the gas sample are thus ionized and the resulting ions are propelled as an unsorted ion beam from the inlet electrode through the slots $S_1$, $S_2$ into the analyzer tube. There the unsorted beam is separated into a plurality of diverging homogeneous ion beams $B_1$, $B_2$, $B_3$, for example by means of an electro-magnetic field produced in the analyzer tube by an electromagnet (not shown). Any one of the diverging beams may be focused on the exit slit at the end of the analyzer tube, so that it passes therethrough and strikes an ion collector. The current thus established in the ion collector is amplified and recorded by suitable apparatus and serves as an index of the quantity of that particular type of ions produced from the sample.

The position of the ion beams with respect to the exit slit (i. e. the focussing) may be changed by varying the electro-magnetic field in the analyzer tube or by varying the propelling potentials. The latter method is preferred and may be practiced as follows:

The switch 42 in the energizing network is closed and the condenser 43 is charged to an appropriate level. Then the switch is opened and the condenser is permitted to discharge through the potential dividing network and the several electrodes in the head of the mass spectrometer. In this way the propelling potentials between the several electrodes gradually decay, while maintaining relative values.

It will be observed, however, that the potentials may be adjusted by suitably setting the potentiometers. Thus the potential at the inlet electrode may be adjusted by varying the setting of the potentiometer 44. Likewise, the potentials at the two propelling electrode segments 22X, 22Y can be varied by varying the setting of the potentiometers 45, 45A, and the potentials of the focussing electrodes 26, 27 may be varied by moving the sliders of the potentiometers 46A, 46. In this way the ion beams may be adjusted to give optimum results at the exit slit and ion collector. Thus by varying the potentials on the electrodes which define the slit $S_1$, the position of the ion beam may be shifted laterally with respect to the slit and may be centered in the slit. By varying the potentials on the electrodes 26, 27 the ions may be brought to a focus in the slit $S_2$ and also the focus may be moved laterally with respect to this slit.

I claim:

1. In a mass spectrometer, the combination which comprises an ionization chamber, an inlet electrode disposed within the chamber and having an inner end provided with a passage for admission of molecules into the chamber, the end having a slot transverse to the passage, a second electrode spaced from the inlet electrode, means for producing an electrical propelling potential between the electrodes in the ionization chamber, and means for propelling an electron beam through the slot transverse to the passage.

2. In a mass spectrometer, the combination which comprises an ionization chamber, an inlet electrode disposed within the chamber and having an inner end provided with a passage for admission of molecules into the chamber, the end having a slot transverse to the passage, a second electrode spaced from the inlet electrode, and having a slit therein in line with the slot in the inlet electrode, means for propelling an electron beam through the slot transverse to the passage for forming ions therein, and means for producing an electrical propelling potential between the electrodes in the ionization chamber to force ions formed in the slot through the slit in the second electrode.

3. In a mass spectrometer, the combination which comprises an inlet electrode having an end provided with a passage for molecules, the end having a slot transverse to the passage, means for propelling an electron beam through the slot transverse to the passage to ionize molecules issuing therefrom, collimating electrodes each having an aperture therein through which an ion beam is propelled from the inlet electrode, an insulating spacer holding the collimating electrodes apart, a plurality of focussing electrodes disposed respectively on opposite sides of the ion beam between the collimating electrodes and between the insulator and the beam, these focussing electrodes being spaced from each other and from the collimating electrodes and the insulator but of such size that they obstruct a major portion of the view between the insulator and the beam.

4. Apparatus according to claim 3 in which the apertures in the collimating electrodes are slits in line with the slot in the inlet electrode.

5. In mass spectrometry involving the propulsion of ions from a first electrode to another by an electrical potential established therebetween, the improvement which comprises forming the ions by bombarding a relatively concentrated stream of molecules with electrons in a space within the first electrode and permitting these ions to pass into the space between the electrodes by diffusion.

6. In mass spectrometry involving the propulsion of ions from a first electrode to a second electrode by an electrical field, the improvement which comprises forming the ions by electron bombardment of molecules in restricted space within the first electrode and permitting them to escape therefrom into the field by diffusion.

7. In mass spectrometry involving the collimation of ions by establishing an electrical field between electrodes provided with orifices through which the ions pass, the improvement which comprises forming the ions by electron bombardment immediately prior to their introduction to the field, causing the ions to enter the field by diffusion, and imposing on the ions a potential having a vector transverse to a line drawn from one orifice to another.

8. In a mass spectrometer having an ionization chamber and a first propelling electrode spaced from the ionization chamber by a spacing ring of insulating material and electrically connected to the ionization chamber through the ring at points spaced from the inner wall thereof, the improvement which comprises a conductive shield ring disposed around the inner wall of the spacing ring, overlapping the inner wall of the ionization chamber and spaced from the electrode.

*9. In a mass spectrometer having an ionization chamber provided with a first electrode having an elongated ion outlet slit, means for introducing molecules into the ionization chamber, means for ionizing the molecules in the chamber and means for propelling ions from the ionization chamber through the slit, the combination which comprises a second electrode spaced from the first electrode and provided with an elongated ion outlet slit substantially in line with the slit in the first electrode, means for impressing a potential between the first and second electrodes to propel the ions through the slit in the second electrode, at least one auxiliary electrode mounted between the first and second electrodes adjacent a side of a slit and means for impressing a potential on the auxiliary electrode intermediate the potential impressed between said first and second electrodes.*

*10. In a mass spectrometer having an ionization chamber provided with a first electrode having an elongated ion outlet slit, means for introducing molecules into the ionization chamber, means for ionizing the molecules in the chamber and means for propelling ions from the ionization chamber through the slit, the combination which comprises a second electrode spaced from the first electrode and provided with an elongated ion outlet slit substantially in line with the slit in the first electrode, means for impressing a potential between the first and second electrodes to propel the ions through the slit in the second electrode, a pair of auxiliary electrodes mounted opposite each other between the first and second electrodes adjacent opposite sides of the slits, and means for impressing a potential on the auxiliary electrodes intermediate the potential impressed between said first and second electrodes.*

*11. Apparatus according to claim 10 wherein the two auxiliary electrodes are of such size as to substantially enclose an ion beam traversing the region between the slits in the first and second electrodes.*

*12. In a mass spectrometer having an ionization chamber, a first electrode adjacent the ionization chamber and having an elongated slit through which ions pass from the chamber, and a second electrode spaced from the first electrode and having an elongated slit substantially in line with the slit in the first electrode, the improvement comprising means for establishing within the space between the first and second electrodes an electrical field having a major component parallel to the axis of ion travel between the slits and a minor component transverse to the major axis of the slits.*

*13. In a mass spectrometer having an ionization chamber provided with a first electrode having an elongated ion outlet slit, means for introducing molecules into the ionization chamber, means for ionizing the molecules in the chamber and means for propelling ions from the ionization chamber through the slit, the combination which comprises a second electrode spaced from the first electrode and provided with an elongated ion outlet slit substantially in line with the slit in the first electrode, means for impressing a potential between the first and second electrodes to propel the ions through the slit in the second electrode, at least one pair of auxiliary electrodes mounted opposite each other between the first and second electrodes adjacent opposite sides of the slits, and means for impressing a potential on the auxiliary electrodes intermediate the potential impressed between said first and second electrodes.*

*14. In a mass spectrometer having an ionization chamber provided with a first electrode having an elongated ion outlet slit, means for introducing molecules into the ionization chamber, means for ionizing the molecules in the chamber and means for propelling ions from the ionization chamber through the slit, the combination which comprises a second electrode spaced from the first electrode and provided with an elongated ion outlet slit substantially in line with the slit in the first electrode, means for impressing a potential between the first and second electrodes to propel the ions through the slit in the second electrode, at least one pair of auxiliary electrodes mounted opposite each other between the first and second electrodes adjacent opposite sides of the slits, means for impressing a potential on the auxiliary electrodes intermediate the potential of the first and second electrodes, and means for independently varying the potential of each of the auxiliary electrodes.*

HAROLD W. WASHBURN.

REFERENCES CITED

The following references are of record in the file of this patent or the original patent:

UNITED STATES PATENTS

| Number | Name | Date |
|---|---|---|
| 2,354,122 | Hipple | July 18, 1944 |
| 2,472,870 | Washburn | June 14, 1949 |

OTHER REFERENCES

Tech. Publication, "The Mass Spectrograph and its Uses" by Walter Bleakney in American Physics Teacher, volume 4, pages 12–23, February, 1936.